(No Model.)

W. A. BODE.
NUT LOCK.

No. 549,101. Patented Nov. 5, 1895.

WITNESSES:

INVENTOR:
WILLIAM A. BODE.
BY
Fred C. Fraentzel,
ATTORNEY

UNITED STATES PATENT OFFICE.

WILLIAM A. BODE, OF ORANGE, NEW JERSEY.

NUT-LOCK.

SPECIFICATION forming part of Letters Patent No. 549,101, dated November 5, 1895.

Application filed August 15, 1895. Serial No. 559,308. (No model.)

*To all whom it may concern:*

Be it known that I, WILLIAM A. BODE, a citizen of the United States, residing at Orange, in the county of Essex and State of New Jersey, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in nut-locks, and has for its primary object to provide a simple, cheap, durable, and efficient means for securing and adjusting nuts to axles of vehicles, machinery, &c., in which the parts are so connected and locked together as to prevent their independent rotation without manipulating the locking devices, thereby providing a means which permits of the easy detachment of the nut without injury to the several parts of the construction.

The invention therefore consists in the novel construction of nut-locks herein set forth, and also in the novel arrangements and combinations of the several parts, such as will be hereinafter fully described, and finally embodied in the clauses of the claim.

The invention is illustrated in the accompanying drawings, in which—

Figure 1:
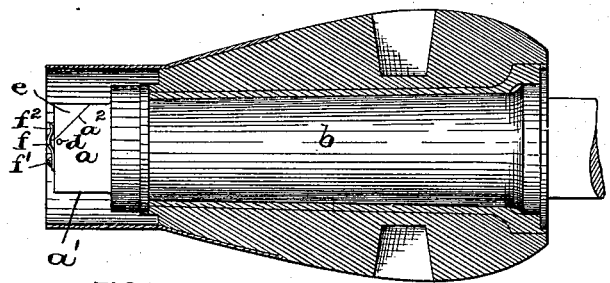
Figure 2:
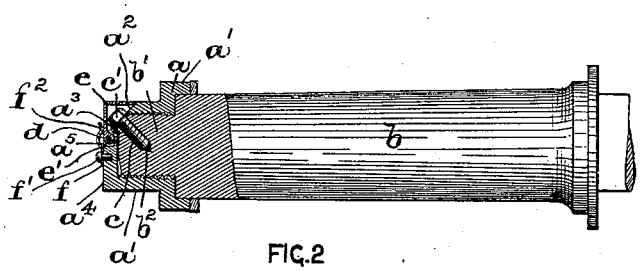
Figure 3:
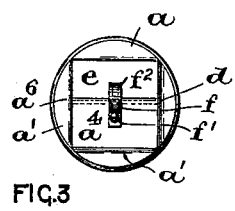
Figure 4:
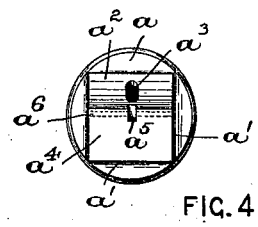
Figure 5:
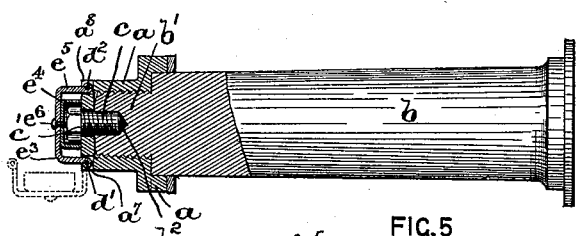
Figure 6:
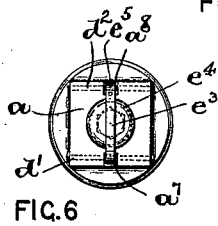

Figure 1 represents a longitudinal vertical section of the hub of the wheel of a vehicle and a portion of the axle illustrating the nut-lock in side elevation. Fig. 2 is a view of part of the axle, partly in elevation and partly in section, illustrating in connection therewith a vertical section of the several parts of the nut-lock. Fig. 3 is an end view of the axle with the nut-lock in position thereon, illustrating the arrangement of a check-bolt and a pivotally-arranged cap on the axle-nut adapted to be closed down over the head of the check-bolt to prevent its accidental displacement. Fig. 4 is a similar view of the axle and its nut with said check-bolt and cap removed. Fig. 5 is a view similar to that illustrated in Fig. 2 of an axle provided with a nut-lock of a slightly-modified form of construction, and Fig. 6 is an end view of the same.

Similar letters of reference are employed in all of the above-described views to indicate like parts.

In said drawings, $a$ indicates the nut, which can be screwed upon the threaded end $b'$ of the axle-arm $b$ of a vehicle or any other well-known form of journal, as clearly indicated in Figs. 1 and 2. Said screw-threaded end $b'$ of the axle-arm is provided with an internal bore $b^2$, which is formed at an angle of about forty-five degrees to the longitudinal axis of the axle-arm, substantially as shown in Fig. 2.

The axle-nut $a$, which is of the usual form and construction on its sides $a'$, has one corner cut away to form the flat surface $a^2$, which, when the nut is screwed in place on the threaded end $b'$ of the axle-arm $b$, comes directly above the angularly-arranged internal bore $b^2$. The said surface $a^2$ is provided with a hole $a^3$, which is preferably oblong, as shown in Fig. 4, and which is brought directly above the open end of the bore $b^2$ when the nut $a$ is screwed down upon the end $b'$ of the axle $b$. The screw-threads in said bore $b^2$ run in the same direction as the threads on the part $b'$ of the axle-arm, whereby both parts can be provided with right-handed threads, which simplifies the construction.

As has been stated, the nut $a$ is threaded internally to fit the threads of the portion $b'$ of the axle-arm $b$, and a check-bolt $c$ is provided which is passed through the hole $a^3$ in the flat surface $a^2$ of the nut $a$ and is firmly screwed into said internal bore $b^2$ until its head $c'$ is securely brought down upon the said flat surface $a^2$ of the nut. In this manner the bolt $c$ serves to check any possible and independent longitudinal movement of the nut $a$ upon the part $b'$ during the rotation of the hub of the wheel of the vehicle on its axle. By this means the construction has been considerably simplified, since I can dispense with the use of a bolt having a left-handed thread, for, owing to the angular arrangement of the bolt $c$ in the bore $b^2$ any longitudinal movement of the nut is positively prevented until the bolt $c$ has been removed, and hence there can be no possible displacement by accident.

To avoid the possibility of the bolt $c$ shaking loose, the surface $a^4$ of the nut $a$ may be formed with a recess $a^5$, into which I have fitted on a pin $d$, arranged in the holes or perforations $a^6$ in said nut $a$, as clearly indicated in dotted outline in Figs. 3 and 4, the perforated ears $e'$ of an angular cap $e$, which is normally held over the head $c'$ of the bolt $c$ by a suitable spring $f$, secured to the surface $a^4$ of the nut $a$ by a screw or pin $f'$, and having its end $f^2$ in operative holding contact with the upper surface of said cap $e$, substantially as illustrated in Figs. 2 and 3. Thus it will be seen that when the cap $e$ is closed down over the head $c'$ of the bolt $c$, any rotary movement of the same in the bore $b^2$ is completely checked and a positive nut-lock is the result.

To remove the bolt $c$ the spring $f$ is turned to one side on its screw or pin $f'$, and the cap $e$ can be thrown back in the manner of a hinge, thereby permitting the use of a wrench on the head of the bolt $c$ to unscrew the same.

In Figs. 5 and 6 I have shown a slightly-modified form of construction, in which the internal bore $b^2$ is provided with threads of a different pitch to the threads on the part $b'$ of the axle-arm $b$, said threads running in an opposite direction to those on the part $b'$, thus making one a right-hand and the other a left-hand thread. The nut $a$ is provided with a recess $a^7$ and a pin $d'$, on which is pivotally arranged an arm $e^3$, to which is secured the cylindrical cap $e^4$. The forwardly and downwardly projecting end $e^5$ of said arm $e^3$ is perforated and fits into a recess $a^8$ in the nut $a$, in which it is held and secured by a pin $d^2$, as will be clearly understood from an inspection of said Figs. 5 and 6. The cap $e^4$ is secured to the arm $e^3$ by means of rivets or screws $e^6$, but it can be formed integral therewith or may be secured thereon in any other well-known manner.

When the arm $e^3$ is secured in its holding position on the nut $a$, the cylindrical cap entirely surrounds the head $c'$ of the bolt $c$, which in this case is concentric with the outer circumference of the threaded part $b'$ of the axle-arm $b$, and said cap thereby prevents any longitudinal movement of the bolt $c$ due to vibration of the parts when passing over rough roads, and the check-bolt $c$, in consequence, prevents any independent longitudinal movement of the nut $a$. In this manner a simply-constructed and safe-locking attachment to the nuts on axles of vehicles, machinery, and the like has been devised; but it will be obvious that the details of the arrangements and combinations of the parts may be changed or modified without departing from the scope of my invention. Hence I do not wish to be limited to the exact forms of construction herein shown. The invention is also applicable to all forms of bolts and nuts.

Having thus described my invention, what I claim is—

1. The combination, with the threaded end of an axle, journal, or the like, having a screw-threaded bore, and a nut on said screw-threaded end, of a check bolt in said bore, and a cap adapted to be closed down upon the head of said bolt to entirely surround the same, said cap being pivotally secured to the face of the nut, substantially as and for the purposes set forth.

2. The combination, with the threaded end of an axle, journal, or the like, having a screw-threaded bore $b^2$, at an angle to the longitudinal axis of the axle, of a nut $a$ on said screw-threaded end, having a chamfered surface $a^2$ and a hole $a^3$ corresponding with the open end of said bore $b^2$, and a check bolt in said bore, substantially as and for the purposes set forth.

3. The combination, with the threaded end of an axle, journal, or the like, having a screw-threaded bore $b^2$ at an angle to the longitudinal axis of the axle, of a nut $a$ on said screw-threaded end, having a chamfered surface $a^2$ and a hole $a^3$ corresponding with the open end of said bore $b^2$, a check bolt in said bore, and an angular cap on said nut, adapted to be closed down upon the head of said bolt, substantially as and for the purposes set forth.

4. The combination, with the threaded end of an axle, journal, or the like, having a screw-threaded bore $b^2$ at an angle to the longitudinal axis of the axle, of a nut $a$ on said screw-threaded end, having a chamfered surface $a^2$ and a hole $a^3$ corresponding with the open end of said bore $b^2$, a check bolt in said bore, a cap adapted to be closed down upon the head of said bolt to surround the same, said cap being pivotally secured to the face of the nut, and a spring $f$ in engagement with the face of said cap, substantially as and for the purposes set forth.

In testimony that I claim the invention set forth above I have hereunto set my hand this 14th day of August, 1895.

WILLIAM A. BODE.

Witnesses:
FREDK. C. FRAENTZEL,
WM. H. CAMFIELD, Jr.